Patented Mar. 24, 1931

1,797,879

UNITED STATES PATENT OFFICE

WILLEM RUDOLFS, OF DAYTON, NEW JERSEY, ASSIGNOR TO NATIONAL ALUMINATE CORPORATION, OF CHICAGO, ILLINOIS, A CORPORATION OF DELAWARE

PROCESS OF TREATING SEWAGE

No Drawing.   Application filed May 16, 1929. Serial No. 363,718.

The present invention relates to an improvement in the treatment of sewage and trade waste waters.

Among the objects of the invention there may be enumerated the following:

(1) The treatment of raw sewage by means of small amounts of salts of trivalent metals, so as to increase greatly the sedimentation rate thereof;

(2) The treatment of the effluent of activated sludge plants and other aeration processes, of sewage contact beds, trickling filters, and the like, with trivalent metal salts prior to conducting said effluent to supplementary filtering basins, or after said effluent has reached the said basins, for the purpose of effecting a coagulation of the suspended solids therein with resultant great increase in the settling rate;

(3) The treatment of sewage, either in the raw state, or after it has been subjected to certain preliminary treatment, not forming a part of the said invention, with trivalent metal salts so as to cause a coagulation of the solids therein in such a manner that the said solids will rise to the surface so that the effluent may be withdrawn through sand filters or the like at very greatly increased speeds, whereby great economy in operation and enormous saving in time will be effected; and (4) To increase the rate of drying of the solids after separation from the major portions of the liquor, whether subjected to decomposition or not.

Other objects of the invention will become apparent in connection with the disclosure hereinbelow.

Disposal of sewage in large communities presents a very serious problem. When near the seaboard, such sewage may be carried out considerably beyond tide water limits and allowed to dissipate itself into the ocean, but inland communities must take some means to remove the suspended solids and as many as possible of the bacteria so that the effluent finally discharged into running streams will be inocuous and will not pollute the said streams. Within recent years many improvements have been made in the art of sewage disposal, the methods dividing themselves naturally into two fundamentally different groups. The first group is known as the aerobic process, in which the sewage liquid and solids are aerated for a given time, usually from 4 to 6 hours or more; as an example, the "activated sludge sewage disposal" system might be cited. The other method is known as the anaerobic process, in which the settled sewage solids are digested in open or closed containers and acted upon by anaerobic bacteria. Examples are: septic tanks, Imhoff tanks, separate sludge tanks.

Irrespective of whether the treatment of sewage is to be by aerobic or anaerobic means, methods must be employed to eliminate as much as possible of the diluent water that is present in sewage. This, in the case of a large city, amounts to an enormous gallonage per day, and it is customary to subject the sewage to a preliminary screening followed by preliminary settling, so that the solids may be obtained in more concentrated form. The liquid from such tanks may then be subjected to oxidizing beds (contact or sprinkling filters), sand beds, or the like. With the activated sludge process, the sewage is aerated causing a flocking out of the organic substances and oxidation of certain quantities and types of suspended materials. These flocculated suspended solids are settled out in tanks and the effluent from these tanks discharged into the receiving water body. As an example of the enormous amounts of the material that has to be treated, it may be stated that the daily sewage of a city of the size of Milwaukee amounts to no less than one hundred million gallons, yielding about one hundred thirty-two tons of dry material.

The particular advantage residing in the present invention is the addition to the raw sewage, after it has passed the coarse and fine screens, or even before any screening at all has been done, of a small amount of ferric salts. These may comprise ferric chloride or other ferric salts, such as ferric sulphate, or ferric aluminum sulphate (feralum), and exert a most remarkable coagulating effect, especially when used in extremely minute amounts, namely, on the order of 3.5 to 5.0 parts per million. Larger amounts do not appear to add materially to the effect obtained, so that it appears quite probable that the action is either catalytic or involves obscure electrical phenomena, such as a change of the charge on the suspended particles, and the relative interfacial tension between the particles and the suspending medium. The effect cannot be explained on the basis of adjusting the sewage to the iso-electric point of the suspended solids because the reaction of the material is but rarely affected, and as other acid salts, and/or acids do not produce this effect, with similar small quantities. Irrespective of the explanation of the benefits obtained here, these are very obvious, and the settling rate is enormously increased.

The addition of ferric chloride to influent of sedimentation tanks, like clarifiers, Imhoff tanks, settling tanks and septic tanks causes a greater removal of suspended solids in a given time with the result that the efficiency of following oxidation or filtering devices is greatly increased, because the load to be handled by such devices is decreased. Moreover, the material collecting on sand filters is of a somewhat looser nature and not nearly as slimy as that usually obtained, allowing a more rapid filtration, especially when covered with green-houses.

For example, in one method of carrying out the present invention, the procedure may be substantially as follows: Raw sewage arriving at the sewage disposal plant is passed through a number of coarse screens consisting of iron bars for the purpose of catching large floating objects, and then passes through a grit chamber, in which heavy particles, such as sand and stones, pieces of iron, and the like that are carried forward by the rapid flow of the sewage will be given a chance to settle. The flow through this grit chamber is, however, entirely too fast to permit of any sedimentation of the more finely divided solids, especially those of organic nature. It is usual to pass the sewage from the said grit chambers through a series of channels into large sedimentation tanks, in which the speed of the advancing sewage is very materially reduced, so that sedimentation of the suspended solids may take place. In ordinary practice about fifty per cent. of the suspended solids will settle at this point. Decreasing the velocity of the sewage flow to allow a greater percentage removal of suspended solids, requires such enormous sedimentation tanks as to be prohibitive in cost for construction and would allow the sewage to become septic, which is greatly detrimental to further treatment.

In accordance with the present invention ferric chloride is fed into the sewage while it is passing from the grit chambers into the main sedimentation tanks. The amount used may be as low as 5 parts per million parts of the sewage. On account of its cheapness, ferric aluminum sulfate may be used as an equivalent for the ferric chloride. The sedimentation accomplished by the addition of the ferric chloride increases the rate of settling to such an extent that sedimentation basins might be decreased by half or more. It is obvious that this reduces the cost of construction considerably and would allow, in certain instances, plants which have insufficient settling capacity to operate better and more normally. It is obvious that this is an enormous advantage, especially as it is accomplished by such an inexpensive and simple means.

After the sewage has traversed the sedimentation tanks, the overflow is often passed to filters. Without the use of ferric chloride the solids collected from these filters are finely divided or sometimes fluffy. Usually provision is made to settle these suspended solids in so-called secondary settling basins, but on account of the nature of the material settle with difficulty. However, when a ferric salt is used, the solids conglomerate and settle rapidly, preventing their passing into the stream, hence speeding up this stage of treatment as well.

Another exemplification of the invention is in the use of ferric chloride for the treatment of the effluent from anaerobic sewage digestion tanks, such as are known as Imhoff tanks, septic tanks, etc., where the same beneficient results of the ferric chloride manifest themselves. This is especially true in cases where no further treatment is provided and large quantities of finely divided, septic solids are discharged into the stream. With a small additional tank and treatment with ferric salts the effluent would be greatly improved and possibly the construction cost of a following oxidation device, like contact beds or sprinkling filters might be saved.

Another advantage is that partly or well digested sewage sludge coming from digestion units will be caused to float, allowing the water to drain off rapidly and further drying is accelerated by the formation of a large number of individual fissures, so that a large surface is exposed. In addition, the treated sludge does not re-absorb rain water which might fall upon it. Inasmuch as the drying of sewage sludge is an expensive operation, anything which thus speeds it up in this manner is of great commercial advantage.

Another point at which the use of ferric salts is advantageous is in the treatment of the sewage prior to the introduction of the solids separated therefrom in the digestion tanks. There appears to be no inhibition of the gas formation during the digestion if the optimum reaction for digestion is properly controlled with alkaline substances, as is practiced at well operated plants, and the effects of the ferric chloride will be evident after the digestion has been completed and the sludge is being removed for drying. The reason for adding ferric chloride prior to introducing the sewage into the anaerobic digestion tanks is to facilitate the withdrawal of supernatant liquid and insure a denser sludge.

Still another use for the ferric salts is to introduce them after final sedimentation of sludge in the activated sludge process and the like, in order to settle out the finely suspended matter which leaves the tanks under ordinary operation and prevent temporary discharges of sludge into receiving water sources when difficulties like "bulking" occur, thereby insuring greater purification of the water in reducing the solids and bacteria content.

The invention is not to be confused with the use of salts for the adjustment of the hydrogen-ion concentration of the sewage so as to reach the iso-electric point of any suspended solids, as it appears that the phenomenon is not tied up with the adjustment of the iso-electric point, but rather that the iron salts exert an independent coagulating and possibly an oxidizing effect, which, at least partially, accounts for the great advantages obtained.

While ferric chloride, ferric sulphate and feralum have been described as the specific iron salts used, the invention is not to be limited thereby, as any salts which, in the presence of water containing dissolved oxygen, are capable of being converted into a ferric salt, will exert similar results, for example, ordinary copperas (ferrous sulphate), when dissolved in water and aerated, will yield a solution containing sufficient of the ferric iron ion to produce the results accomplished by the use of feralum directly, and in the claims the terms "soluble iron salt" are intended to cover both the ferrous and the ferric salts which are soluble in water and hence can be used for addition to sewage.

While iron salts have been described and employed in the invention because of their comparatively low cost, experiments have demonstrated that other trivalent salts of metals of the iron group, such, for example, as manganic salts, nickelic, and cobaltic salts will behave similarly, although their cost at the present time precludes their commercial exploitation. However, such salts are to be considered as equivalents of the trivalent iron salts described.

The means employed for feeding the iron salts into the sewage may be either of the standard liquid-feeding type, in which case the iron salts are used in concentrated solution in water, for example, a fifty per cent. solution of ferric chloride; or else the iron salts, in the usual granular or pulverized form, may be fed by a dry-feeder. It has been found advantageous in some instances, especially in the treatment of effluents, to add a very small amount of lime, say on the order of from 1 to 2 parts per million. The addition of lime, however, is not essential, and does not form a part of the present invention.

What it is desired to protect by Letters Patent is set forth in the hereunto appended claims:

1. A process of treating sewage which comprises adding thereto soluble iron salts in the proportion of from 3.5 to 5.0 parts per million.

2. The process of treating sewage which comprises adding thereto a reagent containing ferric iron ions, amount of the reagent being on the order of from 3.5 to 5.0 parts per million as based on the amount of sewage treated.

In witness whereof, I have hereunto subscribed my name.

WILLEM RUDOLFS.